United States Patent
Tai et al.

(10) Patent No.: US 8,409,514 B2
(45) Date of Patent: Apr. 2, 2013

(54) METHOD AND DEVICE FOR PRODUCING AMMONIA

(75) Inventors: Chang-Hsien Tai, Neipu Hsiang (TW); Wu-Jang Huang, Naipu Hsiang (TW); Chuen-Huey Chiu, Neipu Hsiang (TW)

(73) Assignee: National Pingtung University of Science & Technology, Pingtung County (TW)

( * ) Notice: Subject to any disclaimer, the term of this patent is extended or adjusted under 35 U.S.C. 154(b) by 0 days.

(21) Appl. No.: 13/233,128

(22) Filed: Sep. 15, 2011

(65) Prior Publication Data
US 2013/0034487 A1    Feb. 7, 2013

(30) Foreign Application Priority Data
Aug. 2, 2011    (TW) .............................. 100127412 A

(51) Int. Cl.
*B01J 8/00* (2006.01)
*B01J 19/08* (2006.01)
(52) U.S. Cl. .................... 422/148; 422/608; 422/630
(58) Field of Classification Search .................. 422/148, 422/608, 630; 423/359
See application file for complete search history.

(56) References Cited

U.S. PATENT DOCUMENTS

| | | | |
|---|---|---|---|
| 4,107,277 A * | 8/1978 | da Rosa .......................... | 423/359 |
| 4,298,589 A * | 11/1981 | LeBlanc et al. ............... | 423/359 |
| 7,537,744 B2 | 5/2009 | Benderly et al. | |
| 7,678,352 B2 | 3/2010 | Breuer et al. | |
| 7,785,556 B2 | 8/2010 | Amakawa et al. | |
| 2010/0076097 A1* | 3/2010 | Metz et al. ..................... | 518/702 |
| 2011/0171100 A1 | 7/2011 | Carpenter | |
| 2011/0243828 A1* | 10/2011 | Gordon .......................... | 423/360 |
| 2011/0286907 A1* | 11/2011 | Nakamura et al. ............ | 423/359 |

FOREIGN PATENT DOCUMENTS

TW            200510249        3/2005

* cited by examiner

*Primary Examiner* — Jennifer A Leung
(74) *Attorney, Agent, or Firm* — Alan Kamrath; Kamrath IP Lawfirm, P.A.

(57) ABSTRACT

A method for producing ammonia includes dissolving air in water to obtain a two-phase coexistence aqueous solution with air that is pressurized and heated to a critical state to separate critical state nitrogen, critical state oxygen and critical water from the two-phase coexistence aqueous solution. The critical water is electrolyzed to obtain super critical state hydrogen and super critical state oxygen. The critical state nitrogen reacts with the super critical state hydrogen to produce ammonia. A device for producing ammonia includes a pressurizing member and a heating member mounted between a conversion unit and a mixing unit. The conversion unit outputs a critical state gas. A synthesis unit is connected to the conversion unit by a pipe allowing the critical state gas to flow into the synthesis unit. A gas outlet pipe is connected to the synthesis unit and outputs a synthesis gas from the synthetic unit.

7 Claims, 4 Drawing Sheets

METHOD AND DEVICE FOR PRODUCING AMMONIA

BACKGROUND OF THE INVENTION

1. Field of the Invention

The present invention relates to a method and a device for producing ammonia from biomass and, more particularly, to a method and a device for producing ammonia with improved efficiency while consuming less energy.

2. Description of the Related Art

Conventionally, ammonia is produced through the Haber process (also known as the Haber-Bosch process or the Fritz-Haber process). However, the chemical reconstitution is slow in reactive efficiency. Thus, the conventional method can not fulfill economic need.

Pursuant to continuing improvement in the converting techniques for converting bioenergy, bioenergy conversion has been widely applied in various processes in the chemistry industries. More importantly, various elements contained in the air are important sources for bioenergy conversion and recycling. At the present stage, elements contained in the air can be converted into useful materials through burning, thermal chemical conversion or biochemical conversion, seeking reduction in the consumed energy for producing ammonia while attaining recycling of environmental elements.

In Taiwan Patent Publication No. 200510249 entitled "METHOD FOR THE POINT OF USE PRODUCTION OF AMMONIA FROM WATER AND NITROGEN", a method for producing high-purity ammonia, high-purity hydrogen and high-purity nitrogen out of deionized water and standard nitrogen is proposed. In this method, oxygen is removed from the deionized water, and the oxygen-free deionized water is sent to an electrolytic hydrogen generator to produce hydrogen. Then, the hydrogen is purified and mixed with purified nitrogen. The mixture of the purified hydrogen and the purified nitrogen is then compressed. The compressed mixture is sent to a catalytic ammonia reactor for purification. Finally, the nitrogen, the purified hydrogen and the purified nitrogen are sent to a semiconductor processing machine.

Conventionally, pure gaseous nitrogen directly reacts with gaseous hydrogen obtained from water electrolysis to form the ammonia. However, the bond strength between the hydrogen atom and the oxygen atom of liquid water at normal temperature and normal pressure does not permit separation of the hydrogen atom from the oxygen atom. An external strong current must be provided to electrolyze liquid water to obtain gaseous hydrogen and gaseous oxygen, which consumes considerable energy and requires a long period of time of electrolysis to release sufficient gaseous hydrogen. Thus, the yield of gaseous hydrogen is low, because it is obviously limited to the reaction time of water electrolysis. This leads to a low production efficiency of the gaseous hydrogen, affecting the production efficiency and yield of subsequently formed ammonia.

Furthermore, during the process of electrolyzing the liquid water into gaseous hydrogen and gaseous oxygen, only the gaseous hydrogen is used to react with the gaseous nitrogen to obtain ammonia. Namely, the oxygen is not effectively used, leading to waste and failing to meet the goal of recovering energy.

Thus, a need exists for a method and a device for producing ammonia with improved production efficiency while recovering energy.

SUMMARY OF THE INVENTION

An objective of the present invention is to provide a method for producing ammonia by using gaseous hydrogen obtained from electrolyzing critical state liquid water that consumes less energy, effectively increasing the electrolyzing efficiency of the liquid water.

Another objective of the present invention is to provide a method for producing ammonia for increasing the yield of gaseous hydrogen, effectively increasing the production efficiency of ammonia.

A further objective of the present invention is to provide a device for producing ammonia that reduces the energy consumed for producing the ammonia, effectively saving energy.

Still another objective of the present invention is to provide a device for producing ammonia that can recover and store gaseous oxygen obtained from electrolyzing critical state liquid water, to reuse as energy.

The present invention fulfills the above objectives by providing, in an aspect, a method for producing ammonia which includes a pre-step, a conversion step and a synthesis step. The pre-step includes dissolving air in water to obtain a two-phase coexistence aqueous solution with air. The conversion step includes: pressurizing and heating the two-phase coexistence aqueous solution to a critical state to separate critical state nitrogen, critical state oxygen and critical water from the two-phase coexistence aqueous solution, and electrolyzing the critical water to obtain super critical state hydrogen and super critical state oxygen. The synthesis step includes reacting the critical state nitrogen with the super critical state hydrogen to produce ammonia.

Preferably, the two-phase coexistence aqueous solution in the critical state has a pressure of 221 atm and a temperature of 672K.

Preferably, the two-phase coexistence aqueous solution is pressurized and heated in the pre-step to turn the two-phase coexistence aqueous solution with air into a high temperature/high pressure state.

Preferably, the two-phase coexistence aqueous solution in the high temperature/high pressure state has a pressure of 20 atm and a temperature higher than 330K.

Preferably, the conversion step includes a separation step, a reduction step and an electrolysis step. The critical state nitrogen and the super critical state hydrogen are obtained by the separation step, the reduction step and the electrolysis step.

Preferably, the separation step includes separating high temperature/high pressure gaseous nitrogen, high temperature/high pressure gaseous oxygen and high temperature/high pressure liquid water from the two-phase coexistence aqueous solution.

Preferably, the reduction step includes heating and pressurizing the high temperature/high pressure gaseous nitrogen into critical state nitrogen.

Preferably, the reduction step includes compressing the gaseous nitrogen at 20 atm and 400k into the critical state nitrogen at 221 atm and 672K.

Preferably, the electrolysis step includes heating and pressurizing the high temperature/high pressure liquid water to the critical state to obtain the critical water and electrolyzing the critical water into the super critical state hydrogen and the super critical state oxygen.

Preferably, the high temperature/high pressure liquid water in the critical state has a pressure of 221 atm and a temperature of 672, and the super critical state hydrogen and the super critical state oxygen have a pressure of 230 atm and a temperature of 700K.

In another aspect, a device for producing ammonia including a mixing unit, a conversion unit and a synthesis unit is disclosed. The conversion unit is connected by a first pipe to the mixing unit. A first pressurizing member and a first heating member are mounted between the conversion unit and the mixing unit. The conversion unit outputs a critical state gas. The synthesis unit is connected by a second pipe to the conversion unit. The second pipe allows the critical state gas to flow into the synthesis unit. A gas outlet pipe is connected to the synthesis unit and outputs a synthetic gas from the synthesis unit.

Preferably, the conversion unit includes a separator and an electrolyser. The second pipe includes a first branch pipe, a second branch pipe, and a gas inlet pipe. The separator is connected to the synthesis unit by the first branch pipe, the second branch pipe is connected between the separator and the electrolyser, and the gas inlet pipe is connected between the electrolyser and the synthesis unit.

Preferably, a second pressurizing member and a second heating member are mounted on the first branch pipe, and a third pressurizing member and a third heating member are mounted on the second branch pipe. Preferably, the electrolyser is connected to a current supplier that supplies the electrolyser with electric current.

Preferably, the electrolyser is connected to a storage tank by a gas conveying pipe.

Preferably, a plurality of heat dissipating members is mounted between the electrolyser and the storage tank.

Preferably, the separator is connected by a gas storage pipe to the storage tank.

Preferably, the separator further includes an auxiliary heating member for heating the separator.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
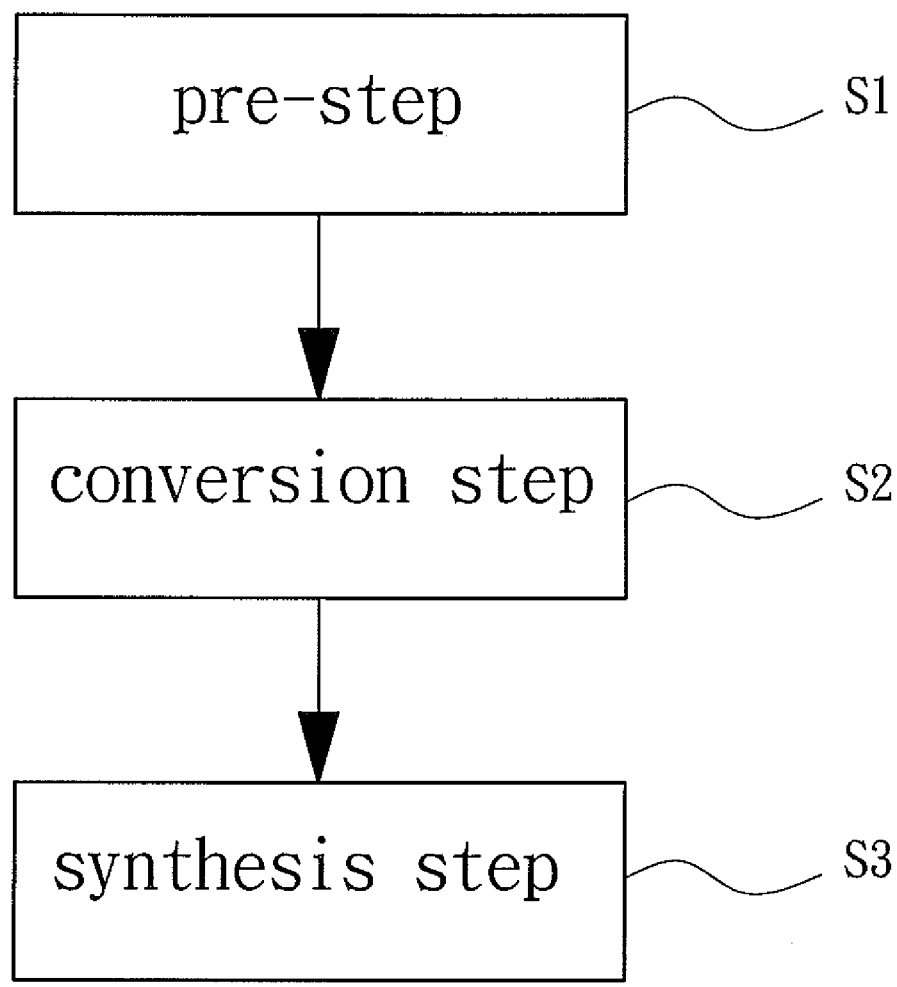
FIG. 1 shows a flowchart illustrating a method for producing ammonia according to the present invention.

With reference to FIG. 1, a method for producing ammonia according to the present invention includes a pre-step S1, a conversion step S2 and a synthesis step S3.

In the pre-step S1, air that contains a variety of elements dissolves in water to obtain a two-phase coexistence aqueous solution with air. The two-phase coexistence aqueous solution is heated and pressurized to the critical state in the conversion step S2, obtaining critical state nitrogen, critical state oxygen and critical water. The critical water is electrolyzed to obtain super critical state hydrogen and super critical state oxygen. In the synthesis step S3, the critical state nitrogen reacts with the super critical state hydrogen to obtain ammonia. Since the aqueous solution can be rapidly heated and pressurized and when the two-phase coexistence aqueous solution reaches the critical state, gaseous hydrogen can be obtained by critical state water electrolysis that consumes less energy. The electrolysis efficiency of liquid water is effectively improved to increase the production efficiency and yield of ammonia.

By use of the two-phase coexistence aqueous solution that can rapidly reach the critical state, the present invention can obtain super critical state hydrogen and super critical state oxygen from water electrolysis that consumes less energy. To achieve better effect with less energy consumption, the present invention uses multiple-stage heating and pressurization which is described hereinafter. It can be appreciated by one skilled in the art that the embodiment is illustrative rather than restrictive.

Figure 2:
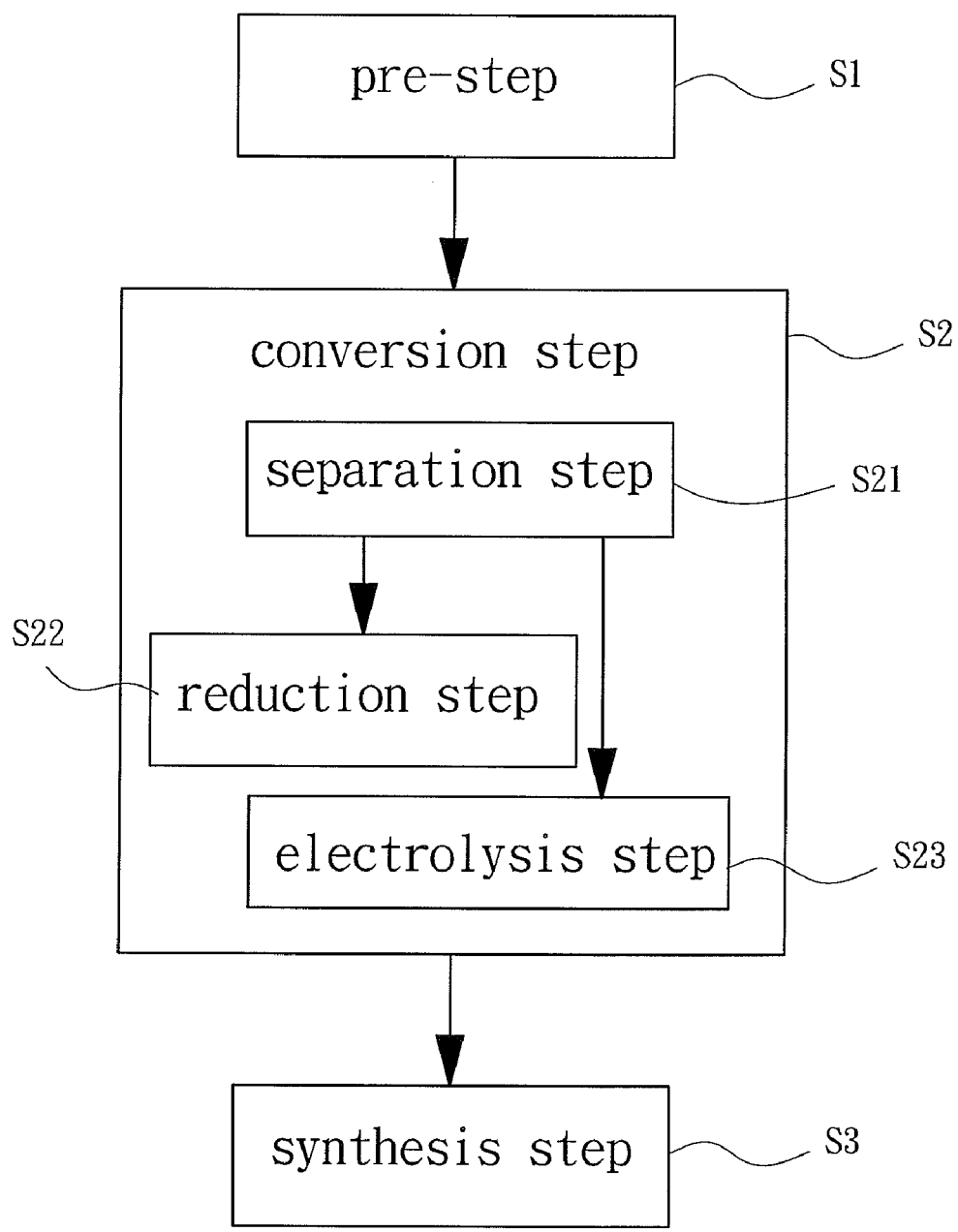
FIG. 2 shows a flowchart illustrating a preferred embodiment of the method for producing ammonia according to the present invention.

FIG. 2 shows a preferred embodiment of the method for producing ammonia according to the present invention. Specifically, the method for producing ammonia includes a pre-step S1, a conversion step S2 and a synthesis step S3.

In the pre-step S1, air dissolves in water, and the two-phase coexistence aqueous solution with air turns into a high temperature/high pressure state. Specifically, since air contains a variety of elements, air can dissolve in liquid water to obtain the two-phase coexistence aqueous solution with air (see chemical equation 1 below).

$$\text{Air}_{(g,T1)} + \text{H}_2\text{O}_{(\lambda,T1)} \rightarrow \text{Air}_{(aq,T1)} \tag{1}$$

wherein T1=298K, and P=1 atm.

Preferably, the two-phase coexistence aqueous solution is pressurized at a normal temperature. The two-phase coexistence aqueous solution turns into a high pressure state when its pressure is above 1 atm. Then, the high pressure state two-phase coexistence aqueous solution is heated to a high temperature, turning the two-phase coexistence aqueous solution into a high temperature/high pressure state (see chemical equation 2 below).

$$\text{Air}_{(aq,T1,P1)} \rightarrow \text{Air}_{(aq,T2,P2)} \tag{2}$$

wherein T1=298K, P1=1 atm, T2=400K, and P2=20 atm.

The term "normal temperature" referred to herein means 298K, which can be appreciated by one skilled in the art. The term "high temperature" referred to herein means a temperature higher than the normal temperature. The term "normal pressure" referred to herein means 1 atm, which can be appreciated by one skilled in the art. The term "high pressure" referred to herein means a pressure higher than the normal pressure.

As an example, in this embodiment, air at 1 atm and 298K dissolves in liquid water at 1 atm and 298K to obtain two-phase coexistence aqueous solution at 1 atm and 298K. The two-phase coexistence aqueous solution at 1 atm and 298K is pressurized by a pump to 20 atm and 330K. The two-phase coexistence aqueous solution is then gradually heated to 400K.

The conversion step S2 includes a separation step S21, a reduction step S22 and an electrolysis step S23. Through the three steps S21, S22 and S23, the two-phase coexistence aqueous solution is heated and pressurized to the critical state, obtaining critical state nitrogen and super critical state hydrogen.

Specifically, in the separation step S21, the two-phase coexistence aqueous solution with air is heated to the critical state where gas separates from liquid. Thus, gaseous nitrogen, gaseous oxygen and liquid water are separated from the two-phase coexistence aqueous solution in which the gaseous nitrogen and the liquid water are maintained in a high temperature/high pressure state (see chemical equation 3 below) while the gaseous oxygen is recycled and stored for use in other industrial processes.

$$Air_{(aq,T2,P2)} \rightarrow N_{2(g,T2,P2)} + O_{2(g,T2,P2)} + H_2O_{(\lambda,T2,P2)} \qquad (3)$$

wherein T2=400K, and P2=20 atm.

After producing high temperature/high pressure gaseous nitrogen in the separation step S21, the high temperature/high pressure gaseous nitrogen is heated and pressurized again in the reduction step S22 to produce critical state high pressure nitrogen (see chemical equation 4 below).

$$2N_{2(g,T2,P2)} \rightarrow 2N_{2(g,T3,P3)} \qquad (4)$$

wherein T3=672K, and P3=221 atm.

In the electrolysis step S23, the high temperature/high pressure liquid water is firstly pressurized and then heated to increase the pressure and temperature such that the high temperature/high pressure liquid water immediately turns into critical water after reaching the critical state. At this time, the bond strength of the hydrogen bond of the critical water molecule is significantly lower than that of the water molecule at normal temperature/normal pressure. Thus, under low-current electrolysis, the bond-dissociation energy of the critical water molecule can be rapidly reached. As a result, the hydrogen molecules and oxygen molecules in the critical water can easily be separated, thereby producing super critical state hydrogen and super critical state oxygen (see chemical equation 5 below).

$$2H_2O_{(\lambda,T2,P2)} \rightarrow 2H_2O_{(\lambda,T3,P3)}$$

$$2H_2O_{(\lambda,T3,P3)} \rightarrow 2H_{2(g,T4,P4)} + O_{2(g,T4,P4)} \qquad (5)$$

wherein T3=672K, P3=221 atm, T4=700K, and P4=230 atm.

As an example, in this embodiment, the two-phase coexistence aqueous solution at 20 atm and 400K is heated to 221 atm and 672K such that super critical state nitrogen, super critical state oxygen and water can be produced from the two-phase coexistence aqueous solution. The pressure and temperature of the gaseous nitrogen are 20 atm and 400K, respectively. The pressure and temperature of the liquid water are 20 atm and 400K, respectively. Next, a pump is used to heat and pressurize the gaseous nitrogen at 20 atm and 400K into critical state nitrogen (at 221 atm and 672K) that serves as one material for subsequent synthesis of ammonia.

On the other hand, a pump is used to compress liquid water at 20 atm and 400K into liquid water at 221 atm. The liquid water at 221 atm is gradually heated to 672K and turns into critical water. Electric current is supplied to perform electrolysis. After reaching the bond-dissociation energy of the critical water, super critical state hydrogen and super critical state oxygen can be separated from the critical water. The hydrogen and oxygen are maintained in the super critical state at 230 atm and 700K. The super critical state hydrogen serves as another material for subsequent synthesis of ammonia. The super critical state oxygen can be recycled and stored for use in other industrial processes.

In the synthesis step S3, the critical state high-pressure nitrogen and the super critical state hydrogen undergo a synthetic reaction to produce gaseous ammonia (see chemical equation 6 below). Specifically, in this embodiment, the critical state nitrogen at 221 atm and 672K reacts with the super critical state gaseous hydrogen at 230 atm and 700K to produce gaseous ammonia after complete synthesis.

$$2N_{2(g,T3,P3)} + 3H_{2(g,T4,P4)} \rightarrow 2NH_{3(g,T5,P5)} \qquad (6)$$

wherein T5=730K, and P5=77 atm.

As mentioned above, in the method for producing ammonia according to the present invention, after dissolving air in liquid water, the two-phase coexistence aqueous solution can easily be pressurized and heated due to tighter molecular alignment between liquid molecules than that between gaseous molecules. Furthermore, after separation of gas from liquid, the gaseous nitrogen can be separated from the air and heated and pressurized to produce critical state nitrogen. At the same time, the liquid water rapidly turns into critical water under second-time heating and pressurization to reduce the bond strength between the hydrogen atom and the oxygen atm. Thus, the bond-dissociation energy of hydrogen molecules and oxygen molecules can easily be reached by electrolysis, rapidly separating super critical state hydrogen and super critical state oxygen from the critical water. Thus, the production efficiency of super critical state hydrogen is increased. As a result, the method for producing ammonia according to the present invention increases the production efficiency of super critical state hydrogen from electrolyzing water by using the critical state while increasing the yield of super critical state hydrogen in a short period of time. Through reaction of a large amount of super critical state hydrogen and critical state nitrogen, the production efficiency and yield of ammonia can be increased.

Figure 3:
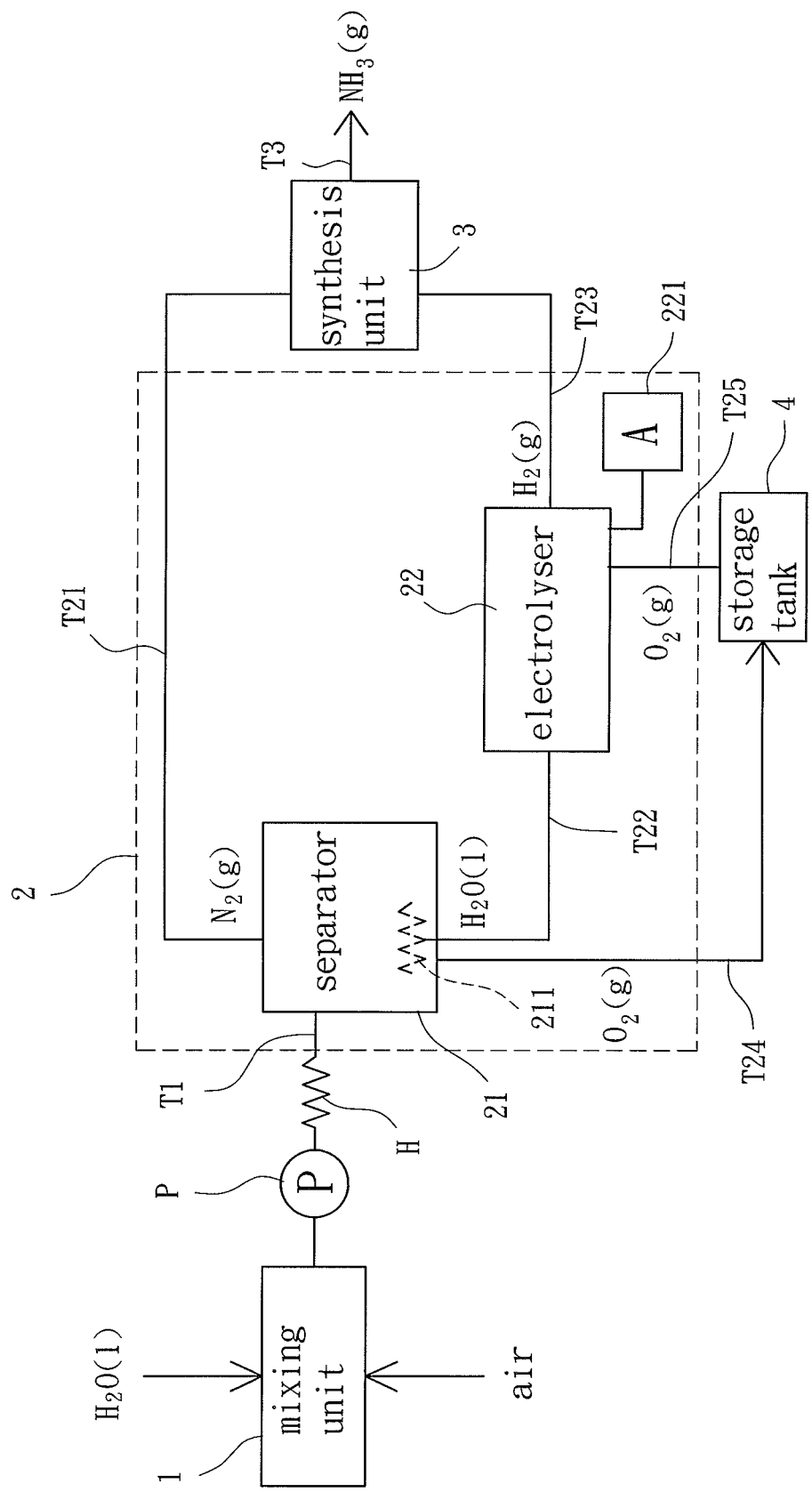
FIG. 3 shows a schematic diagram of a device for producing ammonia of an embodiment according to the present invention.

FIG. 3 shows a device for producing ammonia, which is a preferred embodiment for producing ammonia according to the present invention for more particularly illustrating the method for producing the ammonia according to the present invention.

The device for producing ammonia includes a mixing unit 1, a conversion unit 2 and a synthesis unit 3. The units 1, 2, and 3 are connected by different pipes to form a continuous passage of the device for producing ammonia, which is described in detail as follows.

The mixing unit 1 is used to mix the reactant materials to assure that the reactant materials can flow into subsequent pipes in a liquid state. In this embodiment, the mixing unit 1 is a cooling/absorbing tower to assure that the air entering the mixing unit 1 can completely dissolve in liquid water to save the energy consumed in subsequent pressurization and heating. The conversion unit 2 is connected by a pipe T1 to the mixing unit 1. At least one pressurizing member P and at least one heating member H are provided between the conversion unit 2 and the mixing unit 1. The conversion unit 2 is used to output critical gas. The pressurizing member P is used to compress the two-phase coexistence aqueous solution flowing through the pipe T1. The heating member H is connected to the pressurizing member P through the pipe T1 to heat the two-phase coexistence aqueous solution flowing from the mixing unit 1 through the pipe T1, turning the two-phase coexistence aqueous solution into a high temperature/high pressure state (even nearly the critical state) before entering the conversion unit 2.

The conversion unit 2 includes a separator 21 and an electrolyser 22. The separator 21 is connected by the pipe T1 to the mixing unit 1 to receive the two-phase coexistence aqueous solution flowing through the pipe T1, separating and outputting gaseous nitrogen, gaseous oxygen and liquid water. The separator 21 is connected by a first branch pipe T21 to the synthesis unit 3, allowing flowing of the gaseous nitrogen from the separator 21. A second branch pipe T22 is connected between the electrolyser 22 and the separator 21 to introduce the liquid water flowing through the second branch pipe T22 into the electrolyser 22. The electrolyser 22 dissociates hydrogen and oxygen from the critical water and separately outputs super critical state hydrogen and super critical state oxygen. A gas inlet pipe T23 is connected between the electrolyser 22 and the synthesis unit 3, allowing flowing of the gaseous hydrogen from the electrolyser 22. The two-phase coexistence aqueous solution is obtained by dissolving air in water. The pressurizing member P is preferably a pump.

The synthesis unit 3 is connected by another pipe to the conversion unit 2, allowing a critical state gas to flow into the synthesis unit 3. The synthesis unit 3 is connected to a gas outlet pipe T3 for outputting a synthetic gas from the synthesis unit 3. Specifically, the synthesis unit 3 is connected to the first branch pipe T21 and the gas inlet pipe T23 for receiving the critical state nitrogen flowing in the first branch pipe T21 and the super critical state hydrogen flowing in the gas inlet pipe T23. Therefore, the synthesis unit 3 can perform synthesis for the critical state nitrogen and the super critical state hydrogen to produce ammonia. The ammonia can be outputted by the gas outlet pipe T3 as a source material of industrial processes.

Figure 4:
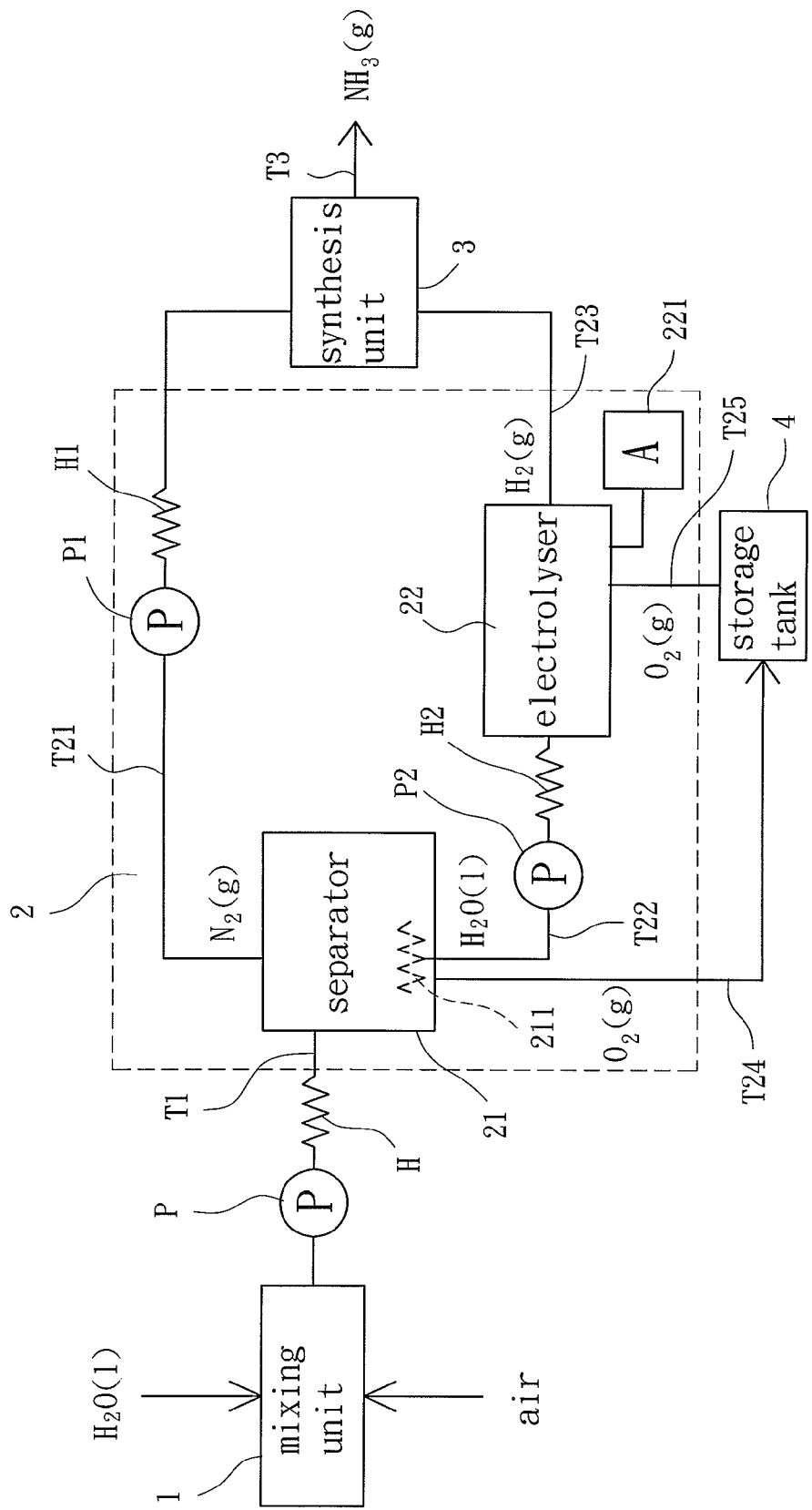
FIG. 4 shows a schematic diagram of a device for producing ammonia of another embodiment according to the present invention.

FIG. 4 shows another embodiment of the present invention using multiple-stage heating/pressurization. With reference to FIG. 4, another pressurizing member P1 and another heating member H1 are provided on the first branch pipe T21. A further pressurizing member P2 and a further heating member H2 are provided on the second branch pipe T22.

By providing the pressurizing member P and the heating member H on the pipe T1, the two-phase coexistence aqueous solution flowing from the mixing unit 1 through the pipe T1 can be turned into a high temperature/high pressure state so that the two-phase coexistence aqueous solution can carry high heat energy into the separator 21. At this time, the separator 21 receives the high temperature/high pressure two-phase coexistence aqueous solution. Furthermore, the separator 21 includes an auxiliary heating member 211 to provide the two-phase coexistence aqueous solution with more heat energy to assure that the high temperature/high pressure two-phase coexistence aqueous solution can reach the temperature allowing separation of gas and liquid in the separator 21. Thus, the separator 21 outputs gaseous nitrogen, gaseous oxygen and liquid water. The detailed structure and operational principle of separation of gas and liquid of the separator 21 are known to one skilled in the art and are, thus, not described in detail to avoid redundancy.

Furthermore, a gas collector (not shown) can be provided above the separator 21 in this embodiment to absorb the gaseous nitrogen from the separator 21. The gaseous nitrogen of the gas collector can be guided by the first branch pipe T21 and compressed by the pressurizing member P1 (the one on the first branch pipe T21) until a critical pressure is reached. The pressurizing member P1 is preferably a pump for increasing the pressure of the gaseous nitrogen. The heating member H1 on the first branch pipe T21 is used to heat the gaseous nitrogen until a critical temperature is reached. Thus, the gaseous nitrogen will be in a high-temperature/high-pressure critical state and will then be outputted to the synthesis unit 3 by the first branch pipe T21. In this embodiment, the separator 21 is further connected to a gas storage pipe T24 that outputs the gaseous oxygen of the separator 21 for storage.

Furthermore, the electrolyser 22 in this embodiment is connected by the second branch pipe T22 to the separator 21, and the pressurizing member P2 connected to the electrolyser 22 compresses the liquid water flowing from the separator 21 through the second branch pipe T22 so that the liquid water can reach the critical pressure value. The pressurizing member P2 is preferably a pump merely for increasing the pressure of the liquid water while maintaining the temperature of the liquid water. The heating member H2 connected to the electrolyser 22 heats the liquid water to the critical temperature value so that the liquid water turns into critical water and flows into the electrolyser 22. At this time, the electrolyser 22 is supplied with suitable current by a current supplier 221 to reach the electrolysis energy level of the critical water. By this arrangement, hydrogen molecules and oxygen molecules are dissociated by the electrolyser 22 from the critical water to respectively output super critical state hydrogen and super critical state oxygen. The detailed structure and operational principle of electrolysis of the electrolyser 22 are known to one skilled in the art and are, thus, not described in detail to avoid redundancy.

Furthermore, the electrolyser 22 can be connected by a gas conveying pipe T25 to a storage tank 4 so that the super critical state oxygen from the electrolyser 22 can be conveyed to and stored in the storage tank 4 for other industrial processes. Further, a plurality of heat dissipating members (not shown) can be mounted between the electrolyser 22 and the storage tank 4 to achieve energy saving effect.

The method for producing ammonia according to the present invention can be used on the device for producing ammonia according to the present invention with simple connection equipment to increase the production efficiency of super critical state hydrogen by electrolysis of liquid water. Furthermore, through reaction of a large amount of super critical state hydrogen with critical state nitrogen, the production efficiency and yield of ammonia can be increased. Further, the device for producing ammonia according to the present invention can reduce the energy loss during the process. Further, the gaseous oxygen not used in the reaction can be recycled and stored, further saving and reusing energy.

In the method for producing ammonia according to the present invention, by using gaseous hydrogen obtained from electrolyzing critical state liquid water that consumes less energy, the electrolyzing efficiency of the liquid water can easily be enhanced.

In the method for producing ammonia according to the present invention, the yield of gaseous hydrogen can be increased to effectively increase the production efficiency of ammonia.

In the device for producing ammonia according to the present invention, the energy consumed for producing the ammonia is reduced to effectively save energy.

In the device for producing ammonia according to the present invention, gaseous oxygen obtained from electrolyzing critical state liquid water can be recycled and stored to reuse energy.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A device for producing ammonia comprising:
    a mixing unit;
    a conversion unit connected by a first pipe to the mixing unit, with a first pressurizing member and a first heating member mounted between the conversion unit and the mixing unit, with the conversion unit outputting a critical state gas, with the conversion unit including a separator and an electrolyser; and a synthesis unit connected by a second pipe to the conversion unit, with the second pipe allowing the critical state gas to flow into the synthesis unit, with a gas outlet pipe connected to the synthesis unit, with the gas outlet pipe outputting a synthetic gas from the synthesis unit, with the second pipe including a first branch pipe, a second branch pine and a gas inlet pipe, with the separator connected to the synthesis unit by the first branch pipe, with the second branch pipe connected between the separator and the electrolyser, with the gas inlet pipe connected between the electrolyser and the synthesis unit.

2. The device for producing ammonia as claimed in claim 1, further comprising:
   a second pressurizing member and a second heating member mounted on the first branch pipe; and
   a third pressurizing member and a third heating member mounted on the second branch pipe.

3. The device for producing ammonia as claimed in claim 1, wherein the electrolyser is connected to a current supplier, with the current supplier supplying the electrolyser with electric current.

4. The device for producing ammonia as claimed in claim 1, wherein the electrolyser is connected to a storage tank by a gas conveying pipe.

5. The device for producing ammonia as claimed in claim 4, wherein a plurality of heat dissipating members are mounted between the electrolyser and the storage tank.

6. The device for producing ammonia as claimed in claim 4, wherein the separator is connected by a gas storage pipe to the storage tank.

7. The device for producing ammonia as claimed in claim 1, wherein the separator further includes an auxiliary heating member, with the auxiliary heating member heating the separator.

* * * * *